US009098671B2

(12) United States Patent
Ding et al.

(10) Patent No.: US 9,098,671 B2
(45) Date of Patent: Aug. 4, 2015

(54) POWER DELIVERY NETWORK ANALYSIS

(71) Applicant: INTERNATIONAL BUSINESS MACHINES CORPORATION, Armonk, NY (US)

(72) Inventors: Tong Hao Ding, Shanghai (CN); Wei Liu, Shanghai (CN); Zegui Pang, Shanghai (CN); Wen Yin, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/289,726

(22) Filed: May 29, 2014

(65) Prior Publication Data

US 2014/0359550 A1 Dec. 4, 2014

(30) Foreign Application Priority Data

May 31, 2013 (CN) .......................... 2013 1 0214005

(51) Int. Cl.
*G06F 17/50* (2006.01)
(52) U.S. Cl.
CPC ........ *G06F 17/5081* (2013.01); *G06F 17/5036* (2013.01); *G06F 2217/78* (2013.01); *G06F 2217/82* (2013.01)
(58) Field of Classification Search
USPC .................................. 716/109, 115, 132, 133
See application file for complete search history.

(56) References Cited

U.S. PATENT DOCUMENTS

| 7,313,771 | B2 * | 12/2007 | Reddy et al. .................. 716/136 |
| 7,983,880 | B1 | 7/2011 | Fender |
| 8,402,402 | B1 | 3/2013 | Fender |
| 2011/0043220 | A1 * | 2/2011 | Leibowitz et al. ............ 324/613 |

OTHER PUBLICATIONS

"Estimation Method for Simultaneous Switching Noise in Power Delivery Network for High-Speed Digital System Design", by T. H. Ding, Y. S. Li, D. C. Jiang, Y. Z. Qu, and X. Yan, Progress in Electronic Research, Feb. 20, 2012.*
Anonymously, "Method for Frequency Domain SSN Analysis of a High-Speed Circuit", IPCOM000146668D; Feb. 19, 2007;pp. 1-3.
T. H. Ding, Y.S. Li, D.C. Jiang, Y.Z Qu, X. Yan, "Estimation Method for Simultaneous Switching Noise in Power Delivery Network for High-Speed Digital System Design". Progress in Electromagnetics Research, vol. 125, pp. 79-95, 2012.
Larry Smith, Raymond Anderson, Douglas Forehand, Thomas Pelc,Tanmoy Roy,"Power Distribution System Design Methodology and Capacitor Selection for Modern CMOS Technology," IEEE Transactions on Advanced Packaging, vol. 22, No. 3 Aug. 1999; pp. 284-291.

(Continued)

*Primary Examiner* — Nha Nguyen
(74) *Attorney, Agent, or Firm* — Anthony J. Canale

(57) ABSTRACT

A method and apparatus for power delivery network (PDN) analysis comprises obtaining time-domain single-pulse current response of the PDN, computing a maximum transient simultaneous switching noise (SSN) of the PDN according to the time-domain single-pulse current response, and determining that noise performance of the PDN conforms to a design requirement of the PDN if the maximum transient SSN is less than a PDN SSN threshold. Transient characteristics of the PDN can be analyzed.

8 Claims, 7 Drawing Sheets

(56) References Cited

OTHER PUBLICATIONS

Bruce Archambeault, Samuel Connor, Joseph Diepenbrock,"Time and Frequency Domain Analysis of Decoupling Capacitor Distance on Printed Circuit Boards," DesignCon 2006; Feb. 6-9, 2006, pp. 1-17.

James Drewniak, Bruce Archambeault, James Knighten, Giuseppe Selli, Jun Fan, Matteo Cocchini, Samuel Connor, Liang Xue, "Comparing Time-Domain & Frequency Domain Techniques for Investigation on Charge Delivery & Power-Bus Noise for High-Speed Printed Circuit Boards," Design Con 2007; Jan. 29-Feb. 1, 2007, pp. 1-29.

Wheling Cheng, Aveek Sarkar, Shen Lin, Ji Zheng,"Worst Case Switching Pattern for Core Noise Analysis," DesignCon 2009,Feb. 2-5, 2009, pp. 1-15.

Larry Smith, Raymond Anderson, Tanmoy Roy,"Power Plane SPICE Models and Simulated Performance for Materials and Geometries," IEEE Transactions on Advanced Packaging vol. 24, No. 3 Aug. 2001; pp. 277-287.

* cited by examiner

POWER DELIVERY NETWORK ANALYSIS

BACKGROUND

The present invention relates to circuit design technology, and more specifically, to a method and apparatus for power delivery network (PDN) analysis.

With the development of integrated circuit techniques, chip integration level has become higher and higher. Digital circuits, analog circuit, RF circuits and other functional circuits are integrated into one single chip, causing increased dynamic current draw (DCD). Thus, simultaneous switching noise (SSN) has become a significant challenge confronted by high speed integration circuit design. SSN has mainly three causing factors: non-ideal signal path inductance, power delivery network (PDN) inductive coupling, and power supply collapse. If SSN exceeds a SSN threshold of an integrated circuit (IC), abnormal operations of functional circuits in the IC may occur as a result.

In general, SSN is measured by noise voltage. According to Ohm's law, SSN caused by PDN is represented as:

$$SSN_{PDN}(j\omega) = Z(j\omega) * \bar{I}(j\omega) \qquad (1)$$

Wherein, $SSN_{PDN}$ represents SSN caused by PDN, Z represents PDN impedance, and I represents load DCD. Those skilled in the art may appreciate that in high-frequency circuits, circuits characteristic are all related to frequency, thus SSN, impedance and DCD are represented in the form of complex numbers.

In equation (1), load DCD is related to load characteristics. Given a constant load, the load DCD is also constant. In other words, in the case of a given load, SSN caused by PDN only depends on PDN impedance. In order to make SSN caused by PDN less than the PDN SSN threshold, Z should be less than an impedance threshold. Rather, the amplitude of Z should be less than a certain impedance amplitude threshold. Z of the PDN is determined by its internal structure. Thus, frequency-domain characteristics of the PDN may be determined through designing the internal structure of the PDN, to ensure that the amplitude of impedance Z of the PDN is less than the impedance amplitude threshold. This is known as a frequency-domain analysis method.

The frequency-domain analysis method actually considers steady state characteristics of circuits, without considering transient characteristics in the time domain, because the frequency-domain analysis method only concerns the amplitude of the impedance Z of the PDN, while transient characteristics are reflected by phase. As a solution, PDN simulation can be carried out in the time domain to obtain transient characteristics of the PDN. However, circuit simulation requires consuming a lot of computing resources.

Thus, a new method for PDN analysis is highly desirable.

SUMMARY

A method and apparatus for PDN analysis is provided in the present invention.

According to one embodiment of the present invention, there is provided a method for PDN analysis, comprising: obtaining time-domain single-pulse current response of the PDN; computing a maximum transient SSN of the PDN according to the time-domain single-pulse current response; and determining that noise performance of the PDN conforms to a design requirement of the PDN if the maximum transient SSN is less than a PDN SSN threshold.

According to another embodiment of the present invention, there is provided a system for PDN analysis, comprising: a time-domain single-pulse current response obtaining means, configured to obtain time-domain single-pulse current response of the PDN; a maximum transient SSN computing means, configured to compute a maximum transient SSN of the PDN according to the time-domain single-pulse current response; and a maximum transient SSN determining means, configured to determine that noise performance of the PDN conforms to a design requirement of the PDN if the maximum transient SSN is less than a PDN SSN threshold.

According to the technical solutions provided in embodiments of this invention, time-domain characteristics of the PDN can be analyzed to in order to determine whether the performance of the PDN meets its design requirement without circuit simulation.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
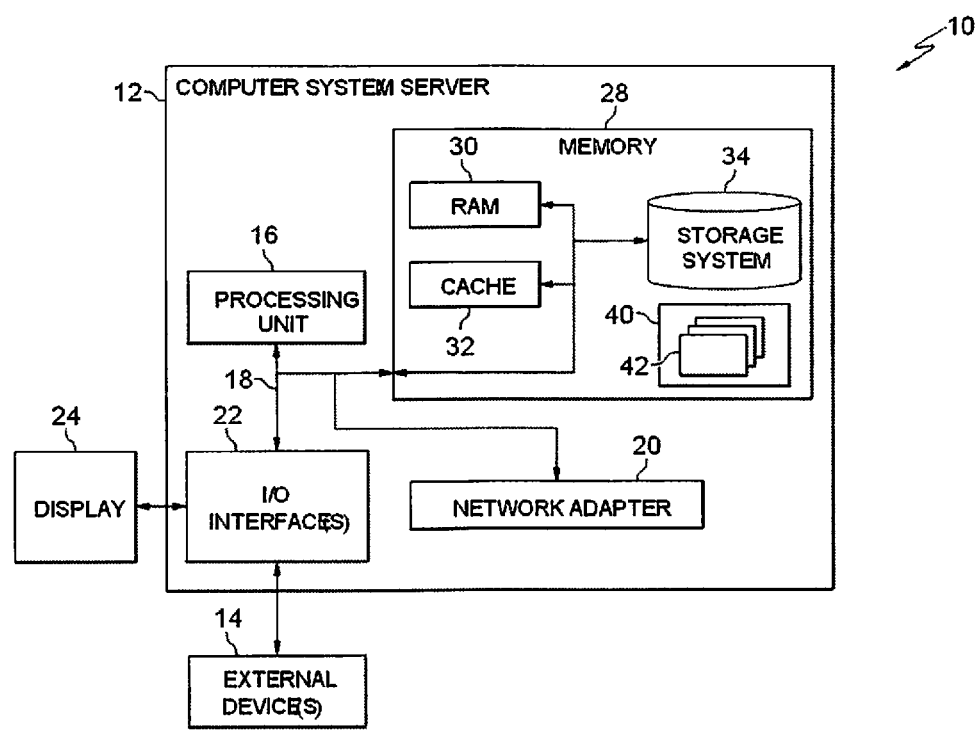
FIG. 1 shows an exemplary computer system 12 which is applicable to implement the embodiments of the present invention.

Some preferable embodiments will be described in more detail with reference to the accompanying drawings, in which preferable embodiments of the present disclosure have been illustrated. However, the present disclosure can be implemented in various manners, and thus should not be construed to be limited to the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
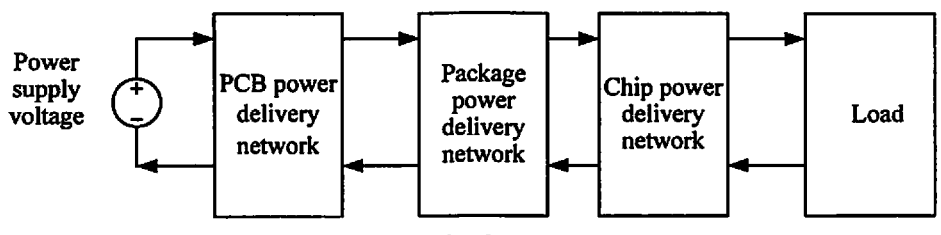
FIG. 2 is a block diagram of a typical system for providing power supply to a load in a chip.

FIG. 2 shows a block diagram of a typical system for providing power supply to a load in a chip. A supply voltage supplies power to an element load on the chip through a PCB (Printed Circuit Board) power delivery sub-network, a package power delivery sub-network, and a chip power delivery sub-network. From a load perspective, the PDN is formed by the supply voltage, the PCB power delivery sub-network, the package power delivery sub-network, and the chip power delivery sub-network together. In general, the supply voltage may be considered as an ideal voltage source, i.e., output voltage is constant. Thus, the noise characteristics of the PDN are determined by the PCB power delivery sub-network, the package power delivery sub-network, and the chip power delivery sub-network. The PCB power delivery sub-network determines the low frequency noise characteristic of the PDN, the package power delivery sub-network determines the middle-frequency noise characteristic of the PDN, and the chip power delivery sub-network determines the high frequency noise characteristic of the PDN.

Figure 3:
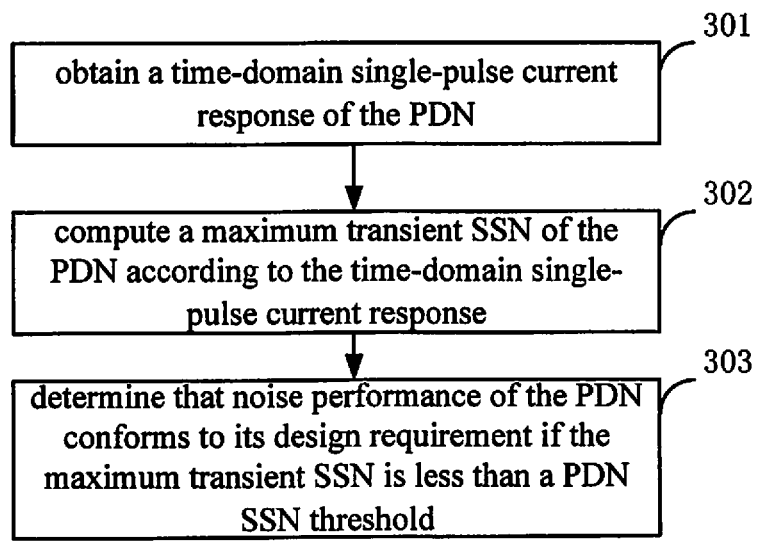
FIG. 3 is a flowchart of a method for PDN analysis according to an embodiment of this invention.

Referring to FIG. 3 now, FIG. 3 depicts a method for PDN analysis according to an embodiment of this invention.

At step 301, a time-domain single-pulse current response of the PDN is obtained.

Figure 4:
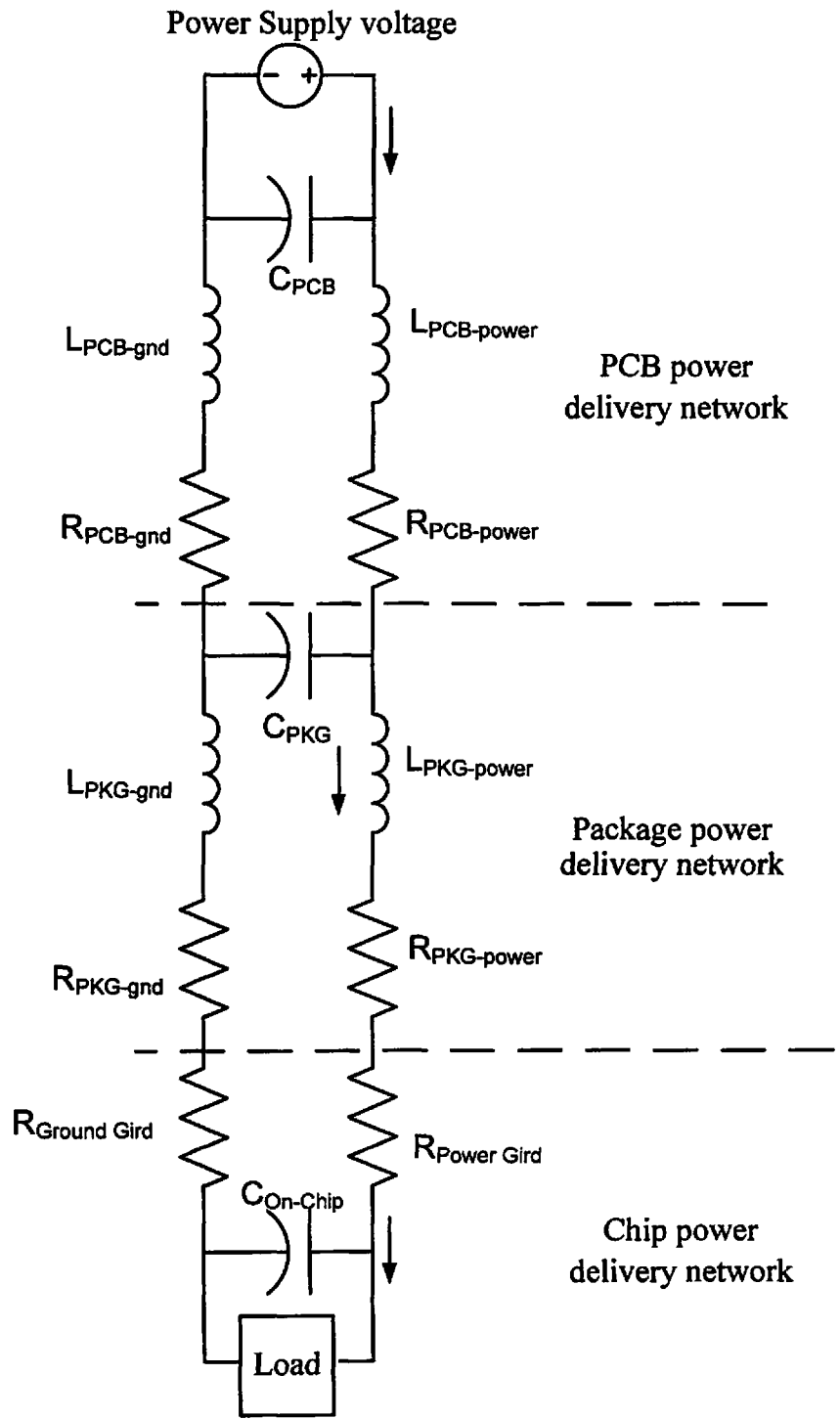
FIG. 4 is an exemplary PDN.

FIG. 4 shows an exemplary PDN, showing parasitic characteristics of the PCB power delivery sub-network, the package power delivery sub-network, and the chip power delivery sub-network described above, i.e., their parasitic resistance, parasitic capacitance, and parasitic inductance. Those skilled in the art may understand that due to the presence of parasitic capacitance and parasitic inductance, when connecting a load into the PDN, the output voltage of the PDN oscillates for a period of time before reaching a stable value. The process of output voltage of the PDN oscillation with time is referred to as the time-domain single-pulse current response of the PDN. In general, the load on a chip may be equivalent to a transistor, and connecting the load into the PDN corresponds to turning on the transistor, with a current flowing through the transistor.

In the description hereinafter, if a load is connected to the PDN at a time, the process of output voltage of the PDN oscillation with time caused by this connection is a time-domain single-pulse current response initiating at that time (as its initial time), or called as a time-domain single-pulse current response at that time. Those skilled in the art may understand that, for given a load, the time-domain single-pulse current response is determined by internal structure of the PDN.

At step 302, a maximum transient SSN is computed for the PDN according to the time-domain single-pulse current response.

The inventors of this invention have found that SSN produced by the PDN at a target time T may be equivalent to the superposition of the values at the target time T of time-domain single-pulse current responses of all times before the target time T minus the steady value. For example, assume that a load is connected into and then disconnected from the PDN four times at time t0, t1, t2 and t3 respectively, SSN produced by the PDN at time t3 is the superposition of the value at t3 of the time-domain single-pulse current response occurred at t0 plus the value at t3 of the time-domain single-pulse current response occurred at t1 and plus the value at t3 of the time-domain single-pulse current response at t3 and finally minus 4 times of the steady value.

As described above, the time-domain single-pulse current response is a signal tending toward a steady value through oscillating with time. When superposing values of the time-domain single-pulse current responses occurred successively, there may be different superposition situations. In the blow description, for simplicity, an exemplary time-domain single-pulse current response is represented by a signal in the following form:

$$v(t)=V_0+V_A e^{-p_r t}\cos(p_i t+\theta)\epsilon(t) \quad (2)$$

In equation (2), t represents time, and v represents the output of the PDN varied with time. A positive rational constant number $V_o$ represents the steady value, and a positive rational constant number $V_A$ represents initial oscillation amplitude. $e^{-p_r t}$ represents that the oscillation amplitude reduces with time, wherein $p_r$ is a positive rational constant number, for determining the speed of oscillation amplitude reduction with time. $\cos(p_i t+\theta)$ represents oscillation with time, wherein $p_i$ and $\theta$ are constants, for determining the frequency and phase of the oscillation. $\epsilon(t)$ represents that the signal starts at time t0 because the load is connected into the PDN at time t0. The signal shown by equation (2) represents the simplest signal that oscillates with time and tends to a steady value.

Correspondingly, SSN produced by the PDN at an arbitrary target time T may be represented by:

$$SSN(T) = V_A \sum_{m=0}^{M} (e^{-p_r(T-t_m)}\cos(p_i(T-t_m)+\theta)\varepsilon(T-t_m)) \quad (3)$$

Wherein, M represents the number of times the load is connected into the PDN, and $t_m$ represents the time at which the load is connected into the PDN.

Figure 5A:
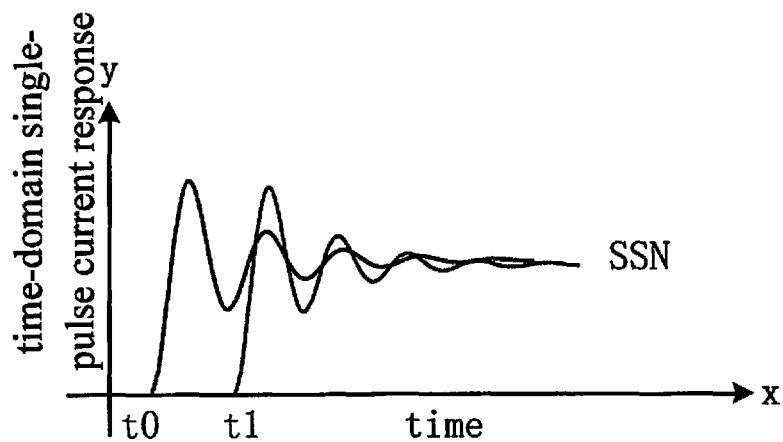
FIG. 5A and FIG. 5B show the superposition of time-domain single-pulse current responses at two times.
Figure 5B:
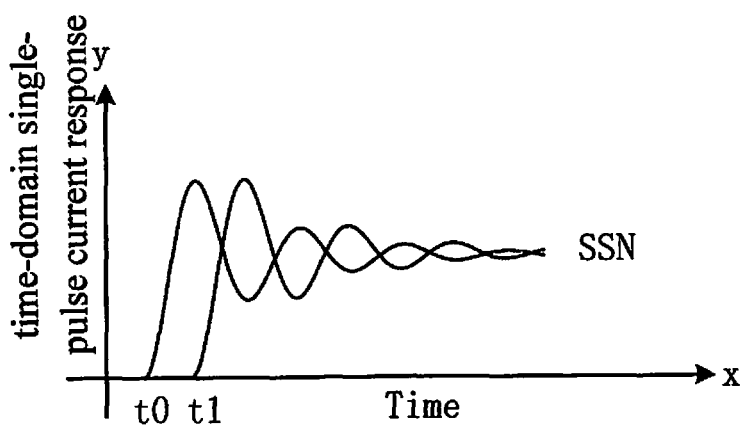

FIG. 5A and FIG. 5B show superposing time-domain single-pulse current responses at two times, i.e., the load is only connected to the PDN twice at t0 and t1. As shown in FIG. 5A, the time-domain single-pulse current response occurred at t0 is superposed with the time-domain single-pulse current response occurred at t1. Wherein, the interval between t0 and t1 makes the time-domain single-pulse current response occurred at t0 and the time-domain single-pulse current response occurred at t1 exhibit peaks or valleys simultaneously, and this superposition is called as in-phase superposition. In FIG. 5B, the interval between t0 and t1 makes that the time-domain single-pulse current response occurred at t0 exhibits a peak while the time-domain single-pulse current response occurred at t1 exhibits a valley, and the time-domain single-pulse current response occurred at t0 exhibits a valley while the time-domain single-pulse current response occurred at t1 exhibits a peak, and this superposition is called as reverse-phase superposition. With different intervals between t0 and t1, the superposition of the time-domain single-pulse current response occurred at t0 and the time-domain single-pulse current response occurred at t1 are those ones in between the in-phase superposition and the reverse-phase superposition. Those skilled in the art may understand that for the in-phase superposition of two signals with the same frequency, maximum signal amplitude can be obtained after the superposition; for the reverse-phase superposition of two signals with the same frequency, minimum signal amplitude can be obtained after the superposition.

SSN produced by the PDN at t1 is the superposition of the value at t1 of the time-domain single-pulse current response occurred at t0 and the value at t1 of the time-domain single-pulse current response occurred at t1, minus two times of $V_0$. That is, SSN produced by the PDN at t1 is:

$$SSN(t_1) = V_A \cos(\theta) + V_A e^{-p_r(t_1-t_0)}\cos(p_i(t_1-t_0)+\theta) \quad (4)$$
$$= V_A(\cos(\theta) + e^{-p_r(t_1-t_0)}\cos(p_i(t_1-t_0)+\theta))$$

It can be seen that SSN produced by the PDN depends on the value of $\cos(\theta)+e^{-p_r(t_1-t_0)}\cos(p_i(t_1-t_0)+\theta)$. If two successive cosine functions have a value of 1 or −1, SSN produced by the PDN has a maximum absolute value, which is the maximum transient SSN of the PDN.

As an extension of the above example, if the load is connected to the PDN three times at t0, t1, and t3, SSN produced by the PDN at t2 is:

$$SSN(t_2) = V_A \cos(\theta) + V_A e^{-p_r(t_2-t_1)}\cos(p_i(t_2-t_1)+\theta) + \quad (5)$$
$$V_A e^{-p_r(t_2-t_0)}\cos(p_i(t_2-t_0)+\theta) = V_A(\cos(\theta) +$$
$$e^{-p_r(t_2-t_1)}\cos(p_i(t_2-t_1)+\theta) + e^{-p_r(t_2-t_0)}\cos(p_i(t_2-t_0)+\theta))$$

Similarly, if the three cosine functions have a value 1 or −1 at the same time, SSN produced by the PDN is the maximum, and its absolute value is the maximum transient SSN.

In digital circuits, a load is connected to a PDN with a period D, the maximum transient SSN of the PDN may be represented as:

$$SSN_{max} = V_A \sum_{m=0}^{M} e^{-p_r mD} \quad (6)$$

Wherein, M represents the number of times the load is connected to the PDN.

In equation (6), if m is increased to a certain extent, $e^{-p_r mD}$ will become too small to have a contribution to the maximum transient SSN of the PDN. According to an embodiment of this invention, equation (6) may be reformed as:

$$SSN_{max} = V_A \sum_{m=0}^{min(M_{max},M)} e^{-p_r mD} \quad (5')$$

According to an embodiment of this invention, $M_{max}$ can be set by the user directly. According to another embodiment of this invention, a tolerance ε may be set by the user, and $M_{max}$ can be computed according to $e^{-p_r N_{max} D} \le \epsilon$.

At step 303, it is determined whether the noise performance of the PDN meets a design requirement of the PDN according to the maximum transient SSN.

Those skilled in the art may understand that the time-domain single-pulse current response of a PDN is determined by the internal structure of the PDN. Correspondingly, according to the above analysis, the maximum transient SSN of the PDN is also determined by the internal structure of the PDN, regardless of how time-domain single-pulse current responses at various times are actually superposed together. The actual SSN of a PDN is necessarily smaller than its maximum transient SSN. Thus, if the maximum transient SSN is less than a PDN SSN threshold, it can be determined that the noise performance of the PDN meets its design requirement.

According to an embodiment of this invention, if the maximum transient SSN is not less than the PDN SSN threshold, a determination is further made about whether the actual maximum SSN of the PDN can meet the SSN design requirement of the PDN. According to the above description, the actual SSN of the PDN is related to the actual superposition of time-domain single-pulse current responses at various times, and SSN of the PDN at any target time T may be represented by equation (3). Thus, through traversing SSN values at various times, the actual maximum SSN value can be obtained.

According to an embodiment of this invention, for a target time T, when computing the maximum transient SSN, only time-domain single-pulse current responses having time intervals to the target time T that are less than a interval threshold $t_{threshold}$ are considered. According to an embodiment of this invention, the interval threshold $t_{threshold}$ may be set by the user directly. According to another embodiment of this invention, a tolerance ε may be set by the user, and the interval threshold $t_{threshold}$ can be computed according to $e^{-p_r t_{threshold}} \le \epsilon$. After obtaining $t_{threshold}$, equation (3) should be reformed as:

$$SSN(T) = V_A \sum_{m=0}^{M}(e^{-p_r(T-t_m)}\cos(p_i(T-t_m)+\theta)\varepsilon(T-t_m)), \quad (3)$$

$$T - t_m \le t_{threshold}$$

Wherein, M is the number of times the load is connected into the PDN before the target time T.

Correspondingly, only SSN values at times in a time window having a width of $t_{threshold}$ are required to be computed, and the maximum of the computed SSN values is selected as the actual maximum SSN value. If the actual maximum SSN value is less than the SSN threshold of the PDN, the noise performance of the PDN also meets the design requirement.

A method of obtaining time-domain single-pulse current response of the PDN according to an embodiment of this invention will be described below.

As described above, because the time-domain single-pulse current response oscillates with time and tends to a steady value, the time-domain single-pulse current response, after having the steady value subtracted, should be represented as an oscillating signal with amplitude tending to zero. In the above example, the signal oscillating with time and tending to a steady value is represented by equation (2). Those skilled in the art may understand that any signal can be decomposed as a combination of a series of signal components having different frequencies. Thus, the portion of the time-domain single-pulse current response having the steady value subtracted is represented as follows.

$$v(t) = \sum_{n=1}^{N} e^{p_{nr}t} \sqrt{(k_{nr}^2 + k_{ni}^2)} \cos(p_{ni}^t + \theta_n)\varepsilon(t) \qquad (7)$$

In equation (7), the portion of the time-domain single-pulse current response having the steady value subtracted is represented as a combination of n signal components in the form shown by equation (2). For the nth signal component, $e^{-p_{nr}t}$ represents that the amplitude tends to zero, wherein $p_{nr}$ is a constant, for determining the speed of the amplitude tending to zero; $\sqrt{(k_{nr}^2 + k_{ni}^2)}$ corresponds to $V_A$ in equation (2), representing initial amplitude, wherein $k_{nr}, k_{ni}$ are constants; $\cos(p_{ni}t+\theta_n)$ represents that the signal is an oscillation signal, wherein $p_{ni}, \theta_n$ are both constants for determining oscillation frequency and phase; $\varepsilon(t)$ represents that the signal component appears after time zero, because the load is connected to the PDN at time zero. Thus, in equation (7), for a specific value of n, a set of parameters $k_{nr}, k_{ni}, p_{nr}, p_{ni}, \theta_n$ are determined, and a signal component is determined accordingly.

Because equation (7) represents the time-domain single-pulse current response of the PDN, the frequency-domain characteristic of PDN impedance, i.e., the relationship between impedance and frequency of the PDN, can be obtained through time-frequency domain conversion on the signal represented by equation (7). Instead, if the frequency-domain characteristic of PDN impedance has been obtained, the time-domain single-pulse current response of the PDN can be obtained through frequency-time conversion.

Figure 6:
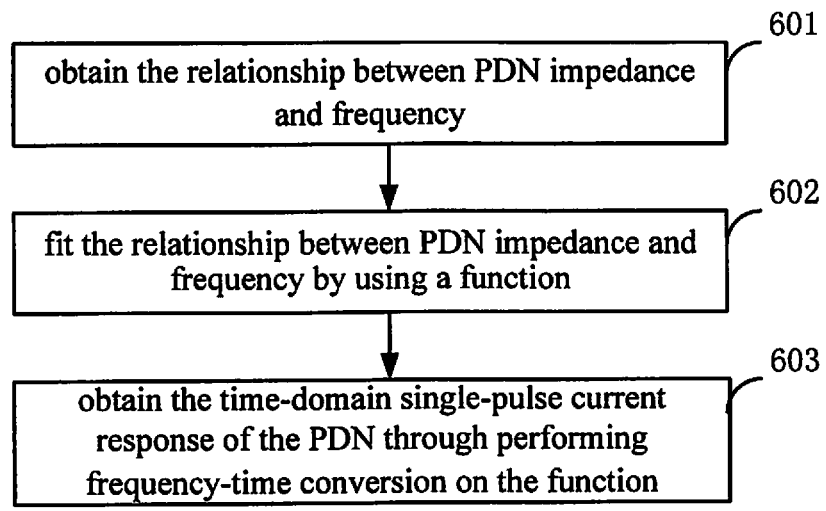
FIG. 6 shows a flowchart of a method for PDN analysis according to an embodiment of this invention.

Below, particular steps of obtaining time-domain single-pulse current response of the PDN according to the above embodiment will be described with reference to FIG. 6.

At step 601, the relationship between PDN impedance and frequency is obtained.

Figure 7A:
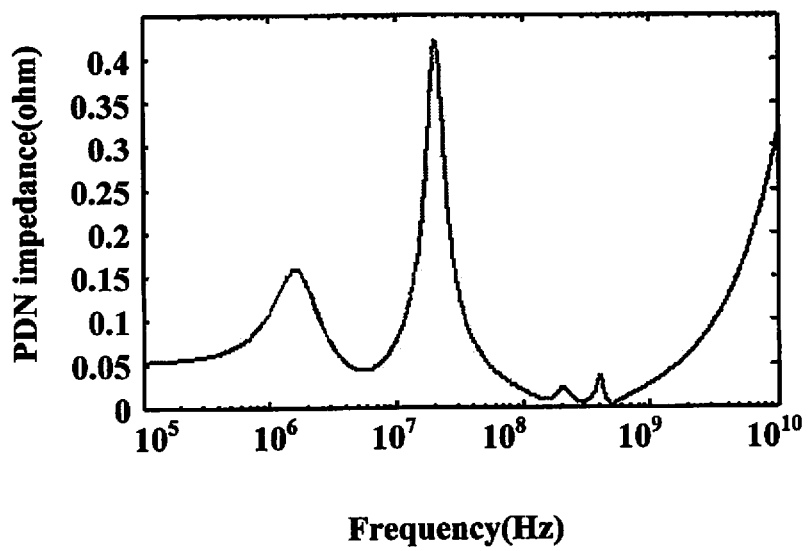
FIG. 7A and FIG. 7B illustrate the relationship between PDN impedance and frequency.
Figure 7B:
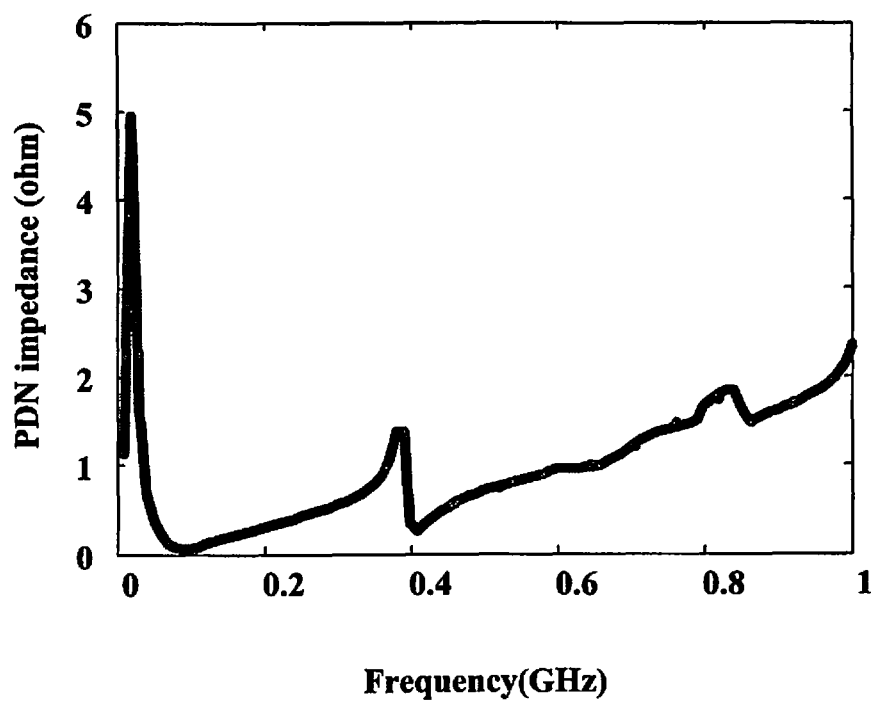

The relationship between PDN impedance and frequency is determined by the PDN's structure. FIG. 4A shows an exemplary PDN for providing power supply for loads in a chip. FIG. 7A and FIG. 7B are the relationship between PDN impedance and frequency when parasitic resistance and parasitic capacitance take different values. Herein, the frequency refers to the frequency of the signal activating the PDN. Those skilled in the art may understand that, according to Ampere's law, if the PDN is activated with a unit current having amplitude of 1 A, the output voltage of the PDN is its output impedance. For a given PDN, the relationship between PDN impedance and frequency can be determined through measuring the output voltage of the PDN when it is activated by a unit current with different frequencies. How to obtain PDN impedance is common technical means in the art, which will not be described in detail herein.

At step 602, the relationship between PDN impedance and frequency is fitted using a function.

The relationship between PDN impedance and frequency obtained at step 601 is represented by a set of discrete points on the PDN impedance-frequency coordinate plane, which has PDN impedance as a coordinate axis and frequency as another coordinate axis. Those skilled in the art may understand that, for any set of discrete points on the coordinate plane, there is at least one function that can be used to fit those points. The following function is adopted in the embodiment for fitting.

$$Z(\omega) = c + \sum_{n=1}^{N} \frac{2k_{nr}(\omega - p_{nr}) - 2k_{ni}p_{ni}}{(\omega - p_{nr})^2 + p_{ni}^2} \qquad (8)$$

In equation (2), Z represents PDN impedance, and ω is frequency. Fitting the relationship between PDN impedance and frequency using a function is to substituting PDN impedance and frequency values obtained at step 601 into equation (8) to find out the values of parameters $c, k_{nr}, k_{ni}, p_{nr}, p_{ni}$. Function fitting is common technical means in the art, which will not be described in detail herein.

At step 603, the time-domain single-pulse current response of the PDN is obtained through performing frequency-time conversion on the function.

After finding out the values of $c, k_{nr}, k_{ni}, p_{nr}, p_{ni}$ in equation (8), the relationship between PDN impedance and frequency may be represented by the function. Further, after the frequency-time conversion of the function in the form shown in equation (8), time-domain single-pulse current response shown in equation (7) is obtained.

Those skilled in the art may understand that the relationship between PDN impedance and frequency is fitted by using a function shown in equation (8), because the time-domain single-pulse current response in the form shown by equation (7) can be obtained through frequency-time conversion performed on equation (8). The time-domain single-pulse current response in the form shown by equation (7) is adopted because the time-domain single-pulse current response is a signal that oscillates with time and tends to a steady value. Thus, a series of signal components in the form shown by equation (2) may be used to represent the time-domain single-pulse current response. Other forms different from equation (2) can be used by those skilled in the art to represent oscillation amplitude tending to zero. For example, instead of representing oscillation amplitude tending to zero by a function of a negative power of e, it can be represented by the reciprocal of time also. Thus, the time-domain single-pulse current response may have a form different from equation (7). Correspondingly, a form different from equation (8) is required to fit the relationship between PDN impedance and frequency.

When representing time-domain single-pulse current response by the form shown in equation (7), it is equivalent to represent time-domain single-pulse current response with n signal components. In general, the bigger N is, the more accurate approximation of the time-domain single-pulse current response can be obtained by using the signal components. However, the bigger N is, the more calculation is required to fitting and frequency-time conversion. As shown in FIG. 7A and FIG. 7B, the amplitude of PDN impedance has "peaks" in some frequency intervals, which may be called as peak intervals. In order to reduce the amount of calculation in frequency-time conversion, the frequency-domain characteristic may be simplified as having non-zero values in the peak intervals and zero values at other frequencies. Correspondingly, N is determined as the number of peak intervals present. Accordingly, equation (8) comprises N function components, each corresponding to a set of values of $c, k_{nr}, k_{ni}, p_{nr}, p_{ni}$.

In addition to the above embodiment, other methods can be used to obtain the time-domain single-pulse current response of the PDN. For example, according to the definition of time-domain single-pulse current response, the procedure of PDN output voltage oscillating with time and tending to a steady value of after load connection is defined as time-domain single-pulse current response. Thus, the time-domain single-pulse current response can be obtained through measuring the output voltage of the PDN after load connection. Also, in the case of the known internal structure of the PDN, the time-domain single-pulse current response can be obtained through simulating the PDN.

Figure 8:
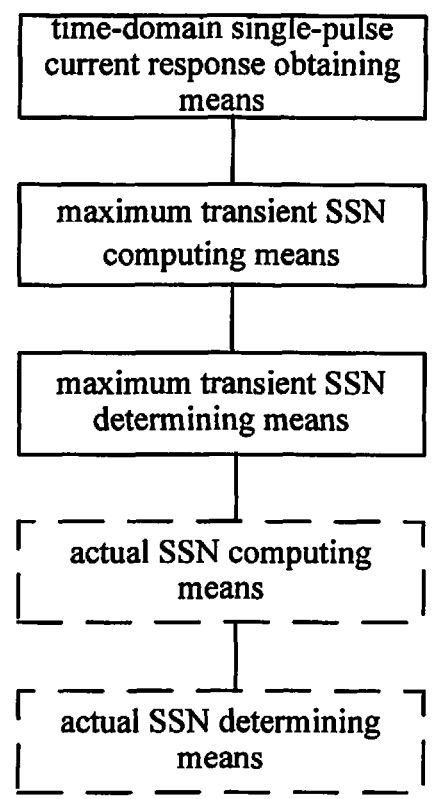
FIG. 8 is a block diagram of a system for PDN analysis according to an embodiment of this invention.

FIG. 8 shows a block diagram of a system for PDN analysis according to an embodiment of this invention. The system comprises:

a time-domain single-pulse current response obtaining means, configured to obtain time-domain single-pulse current response of the PDN;

a maximum transient SSN computing means, configured to compute a maximum transient SSN of the PDN according to the time-domain single-pulse current response; and a maximum transient SSN determining means, configured to determine that noise performance of the PDN conforms to a design requirement of the PDN if the maximum transient SSN is less than a PDN SSN threshold.

According to an embodiment of this invention, the system further comprises:

an actual SSN computing means, configured to compute actual SSN of the PDN, wherein the actual SSN at any target time is the superposition of values at the target time of time-domain single-pulse current responses occurred at various times before the target time;

an actual SSN determining means, configured to determine that noise performance of the PDN conforms to a design requirement of the PDN if the maximum value of the actual SSN is less than the PDN SSN threshold.

According to the embodiment of this invention, wherein the actual SSN computing means comprises:

a module, configured to compute actual SSN for each target time within a time window having a width of $t_{threshold}$, wherein $t_{threshold}$ is a time length enabling the initial time-domain single-pulse current response to attenuate with time to an extent lower than an allowable error.

According to the embodiment of this invention, wherein the time-domain single-pulse current response obtaining means comprises:

a module configured to obtain the relationship between PDN impedance and frequency;

a module configured to fit the relationship between PDN impedance and frequency by using a function; and a module configured to perform frequency-time conversion on the function to obtain time-domain single-pulse current response of the PDN;

wherein the function after the frequency-time conversion represents a signal oscillating with time and attenuating to stability.

According to the embodiment of this invention, the function comprises a combination of a plurality of function components, each after the frequency-time conversion representing a signal oscillating with time and attenuating to stability.

According to the embodiment of this invention, wherein the number of the function components is equal to the number of frequency intervals having peaks therein of PDN impedance determined according to the relationship between PDN impedance and frequency.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for power delivery network (PDN) analysis, comprising: obtaining a time-domain single-pulse current response of the PDN; computing, by a computer, an actual simultaneous switching noise (SSN) of the PDN, wherein the actual SSN at any target time is the superposition of values at the target time of time-domain single-pulse current responses which occurred at various times before the target time and each target time is within a time window having a width of $t_{threshold}$, wherein $t_{threshold}$ is a time length to make the time-domain single-pulse current response at an initial time attenuate with time to an extent lower than an allowable error; determining that noise performance of the PDN conforms to the design requirement when the maximum value of the actual SSN is less than a PDN SSN threshold; and providing the PDN to an integrated circuit when the maximum value of the actual SSN is less than the PDN SSN threshold.

2. The method according to claim 1, wherein obtaining the time-domain single-pulse current response of the PDN comprises: obtaining the relationship between PDN impedance and frequency; fitting the relationship between PDN impedance and frequency by using a function; and performing frequency-time conversion on the function to obtain the time-domain single-pulse current response of the PDN;

wherein the function after the frequency-time conversion represents a signal oscillating with time and attenuating to stability.

3. The method according to claim 2, wherein the function comprises a combination of a plurality of function components, each after the frequency-time conversion representing a signal oscillating with time and attenuating to stability.

4. The method according to claim 3, wherein the number of the function components is equal to the number of frequency intervals having peaks therein of the PDN impedance determined according to the relationship between PDN impedance and frequency.

5. A system for power delivery network (PDN) analysis, comprising: a time-domain single-pulse current response obtaining means executed by a processing unit, configured to obtain a time-domain single-pulse current response of the PDN; an actual simultaneous switching noise (SSN) computing means executed by a processing unit, configured to compute an actual SSN of the PDN, wherein the actual SSN at any target time is the superposition of values at the target time of time-domain single-pulse current responses which occurred at various times before the target time, and wherein the actual SSN computing means comprises a module, configured to compute actual SSN for each target time within a time window having a width of $t_{threshold}$, wherein $t_{threshold}$ is a time length making the time-domain single-pulse current response at an initial time attenuate with time to an extent lower than an allowable error; an actual SSN determining means executed by a processing unit, configured to determine that noise performance of the PDN conforms to the design requirement when the maximum value of the actual SSN is less than a PDN SSN threshold; and a providing means executed by a processing unit, configured to provide the PDN to an integrated circuit when the maximum value of the actual SSN is less than the PDN SSN threshold.

6. The system according to claim 5, wherein the time-domain single-pulse current response obtaining means comprises: a module configured to obtain the relationship between PDN impedance and frequency; a module configured to fit the relationship between PDN impedance and frequency by using a function; and time-domain single-pulse current response of the PDN; wherein the function after the frequency-time conversion represents a signal oscillating with time and attenuating to stability.

7. The system according to claim 6, wherein the function comprises a combination of a plurality of function components, each after the frequency-time conversion representing a signal oscillating with time and attenuating to stability.

8. The system according to claim 7, wherein the number of the function components is equal to the number of frequency intervals having peaks therein of PDN impedance determined according to the relationship between the PDN impedance and frequency.

* * * * *